US012510560B2

(12) United States Patent
Gattere et al.

(10) Patent No.: US 12,510,560 B2
(45) Date of Patent: Dec. 30, 2025

(54) MICROMECHANICAL DEVICE FOR ENHANCED ACCELERATION MEASUREMENT

(71) Applicant: STMICROELECTRONICS S.r.l., Agrate Brianza (IT)

(72) Inventors: Gabriele Gattere, Castronno (IT); Francesco Rizzini, Passirano (IT); Nicolo' Manca, Turin (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 360 days.

(21) Appl. No.: 18/169,142

(22) Filed: Feb. 14, 2023

(65) Prior Publication Data

US 2023/0266357 A1    Aug. 24, 2023

(30) Foreign Application Priority Data

Feb. 24, 2022    (IT) .................. 102022000003506

(51) Int. Cl.
*G01P 15/125*    (2006.01)
*G01P 15/08*    (2006.01)

(52) U.S. Cl.
CPC .... *G01P 15/125* (2013.01); *G01P 2015/0814* (2013.01)

(58) Field of Classification Search
CPC .......... G01P 2015/0851; G01P 15/125; G01P 2015/0814; G01P 2015/0871
See application file for complete search history.

(56) References Cited

U.S. PATENT DOCUMENTS 6,865,944 B2    3/2005 Glenn et al.
9,702,889 B2    7/2017 Lin et al.
(Continued)

FOREIGN PATENT DOCUMENTS

CN    106597014 A    4/2017
CN    208283647 U    12/2018
(Continued)

OTHER PUBLICATIONS

Xiong et al., "Using Electrostatic Spring Softening Effect to Enhance Sensitivity of MEMS Resonant Accelerometers," IEEE Sensors Journal, vol. 21, No. 5, Mar. 1, 2021, pp. 5819-5827.
(Continued)

*Primary Examiner* — Jennifer Bahls
(74) *Attorney, Agent, or Firm* — Seed IP Law Group LLP

(57) ABSTRACT

Micromechanical device comprising: a semiconductor body; a movable structure configured to oscillate relative to the semiconductor body along an oscillation direction; and an elastic assembly with an elastic constant, coupled to the movable structure and to the semiconductor body and configured to deform along the oscillation direction to allow the oscillation of the movable structure as a function of an acceleration applied to the micromechanical device. The movable structure and the semiconductor body comprise a control structure for the capacitive control of the oscillation of the movable structure: when the control structure is electrically controlled in a first state the micromechanical device is in a first operating mode wherein a total elastic constant of the micromechanical device has a first value, and when it is electrically controlled in a second state the micromechanical device is in a second operating mode wherein the total elastic constant has a second value lower than, or equal to, the first value.

20 Claims, 5 Drawing Sheets

(56) References Cited

U.S. PATENT DOCUMENTS

| | | |
|---|---|---|
| 11,698,388 B2 | 7/2023 | Darmanin et al. |
| 2003/0210511 A1 | 11/2003 | Sakai et al. |
| 2004/0129077 A1 | 7/2004 | Franz et al. |
| 2004/0182157 A1 | 9/2004 | Sakai et al. |
| 2006/0071578 A1 | 4/2006 | Drabe et al. |
| 2006/0107743 A1 | 5/2006 | Ullmann |
| 2008/0098815 A1* | 5/2008 | Merassi ............ G01P 1/023 73/514.18 |
| 2011/0132089 A1 | 6/2011 | Jeong et al. |
| 2012/0000287 A1 | 1/2012 | Frangi et al. |
| 2012/0160029 A1 | 6/2012 | Yamaguchi et al. |
| 2014/0260613 A1 | 9/2014 | Qiu et al. |
| 2015/0205092 A1 | 7/2015 | Sasagawa et al. |
| 2015/0316582 A1 | 11/2015 | Tanaka |
| 2016/0349056 A1 | 12/2016 | Thompson et al. |
| 2017/0073214 A1 | 3/2017 | Matsuoka et al. |
| 2017/0082519 A1 | 3/2017 | Blomqvist et al. |
| 2017/0168088 A1 | 6/2017 | Coronato et al. |
| 2017/0284804 A1 | 10/2017 | Gattere et al. |
| 2017/0285064 A1 | 10/2017 | Tocchio et al. |
| 2018/0045515 A1 | 2/2018 | Simoni et al. |
| 2018/0328959 A1 | 11/2018 | Classen et al. |
| 2019/0002274 A1 | 1/2019 | Cardanobile |
| 2019/0187170 A1 | 6/2019 | Painter et al. |
| 2021/0190814 A1* | 6/2021 | Darmanin ............ B81B 3/007 |
| 2023/0296643 A1 | 9/2023 | Darmanin et al. |

FOREIGN PATENT DOCUMENTS

| | | |
|---|---|---|
| CN | 109987569 A | 7/2019 |
| GB | 2561886 A | 10/2018 |

OTHER PUBLICATIONS

U.S. Appl. No. 18/322,488, filed May 23, 2023.
U.S. Appl. No. 17/122,793, filed Dec. 15, 2020.

* cited by examiner

FIG. 1

MICROMECHANICAL DEVICE FOR ENHANCED ACCELERATION MEASUREMENT

BACKGROUND

Technical Field

The present disclosure relates to a micromechanical device for enhanced acceleration measurement. In particular, it relates to a micromechanical device (MEMS-type sensor), to a measurement device comprising the micromechanical device, to a control method of the micromechanical device and to a relative computer program product. The micromechanical device comprises a capacitively controllable control structure to vary a total elastic constant of the micromechanical device (indicative of its stiffness), so as to be able to perform a first acceleration measurement with maximum full scale range and minimum sensitivity and subsequently, as a function of the result of the first acceleration measurement, perform a second acceleration measurement, optimized, with a lower full scale range and greater sensitivity.

Description of the Related Art

As is known, the need is felt to effectively sense and measure accelerations and shocks through sensors with small and easily integrable dimensions. Common applications include the monitoring of shocks in electronic devices such as cell phones and smartwatches, for example to sense car accidents or any falls to the ground of a person following a malaise or of a patient suffering from a medical condition.

Nowadays low-G sensors (such as accelerometers and gyroscopes) for sensing reduced accelerations (for example, having full scale ranges, FSR, equal to 16 G or 32 G) and high-G sensors for sensing high accelerations (for example, having full scale ranges equal to 128 G) are known on the market. The former are used to sense usual movements (such as rotations of the cell phone screen, or movement of the wrist whereto the smartwatch is connected) of operators provided with the electronic device integrating the sensors, while the latter allow high-intensity accelerations (and therefore, abnormal events such as falls or shocks) to be sensed.

Moreover, it is known that the FSR and the measurement sensitivity (i.e., the displacement of the seismic mass of the sensor per unit of acceleration applied thereto) are inversely proportional to each other. Thus, high-G sensors sense greater FSR with lower sensitivity and low-G sensors sense lower FSR with greater sensitivity.

In order to allow an electronic device to sense both low and high accelerations, known solutions provide for the integration, in the electronic device, of both types of accelerometers. However, the simultaneous presence in the same electronic device of two different accelerometers entails disadvantages such as a greater number of necessary pads and greater complexity in the required control circuitry (for example, ASIC, PCB or dedicated CPU, etc.), and more generally a greater integration area, a lower portability of the electronic device and a greater cost for its manufacturing.

Other solutions comprise the use of a single sensor that has a mechanical structure with a variable resonance frequency owing to a mechanical contact between two parts of the same sensor. For example, the sensor may comprise: two seismic masses coupled, through respective elastic elements, to a substrate and configured to abut against each other for accelerations greater than a threshold acceleration, consequently modifying the overall elastic constant of the sensor; a seismic mass coupled to a substrate through a first elastic element and configured to abut against a second elastic element for accelerations greater than a threshold acceleration; or a seismic mass coupled to a substrate through an elastic element which, for accelerations lower than a threshold acceleration, deforms completely with a first elastic constant and, for accelerations greater than the threshold acceleration, deforms only partially with a second elastic constant greater than the first elastic constant (due to a mechanical contact of the elastic element with the seismic mass which modifies the effective length of the elastic element). These solutions therefore base the adaptation of the elastic constant on mechanical contacts between parts of the same sensor.

However, these mechanical contacts may cause problems in some situations, such as damage to the movable parts due to shocks being too high or sticking of the parts that abut against each other (and therefore the subsequent impossibility of mutually detaching them).

Moreover, it may not be easy to identify the acceleration threshold point that leads to the change of elastic constant of the sensor, and this may increase the margin of error of the measurement at the threshold acceleration.

Moreover, these solutions allow a single variation of elastic constant (i.e., the single switching from a first value to a second value of elastic constant, and vice versa), and this implies that the trade-off between FSR and measurement sensitivity continues to be a relevant limit during the design step of the sensor.

BRIEF SUMMARY

The present disclosure is directed to a micromechanical device, a measurement device comprising the micromechanical device, a control method of the micromechanical device and a relative computer program product.

The present disclosure is directed to a micromechanical device that includes a semiconductor body having a surface, a movable structure facing said surface of the semiconductor body, the movable structure having an opening in a central region, and a measurement structure. The measurement structure includes a first measurement electrode extending from the movable structure in the opening, the first measurement electrode extending towards a first side of the movable structure and two second measurement electrodes fixed to the semiconductor body and in the opening of the movable structure, the first measurement electrode between the two second measurement electrodes.

The device includes a control structure including a first control electrode extending from the first side of the movable structure and away from the opening in the movable structure; and two second control electrodes fixed to the semiconductor body, the first control electrode extending between the two second control electrodes, an elastic assembly which has an equivalent elastic constant ($K_{eq}$), is mechanically coupled to the movable structure and to the semiconductor body and is configured to elongate and contract along the oscillation direction to allow the oscillation of the movable structure as a function of a force applied to the movable structure along said oscillation direction, said force being caused by an acceleration applied to the micromechanical device the micromechanical device having a total elastic constant ($K_t$) which is a function of the equivalent elastic constant ($K_{eq}$) and which is variable over time as a function of said capacitive control by the control structure. The control structure is electrically controlled in a first state, the micromechanical device is in a first operating mode wherein the total elastic constant ($K_t$) has a first value, and when the control structure is electrically controlled in a second state, the micromechanical device is in a second operating mode wherein the total elastic constant ($K_t$) has a second value lower than, or equal to, the first value.

BRIEF DESCRIPTION OF THE SEVERAL VIEWS OF THE DRAWINGS

For a better understanding of the present disclosure, a preferred embodiment is now described, purely by way of non-limiting example, wherein:

FIG. 1 is a plan view of a micromechanical device, according to an embodiment;

Figure 2:
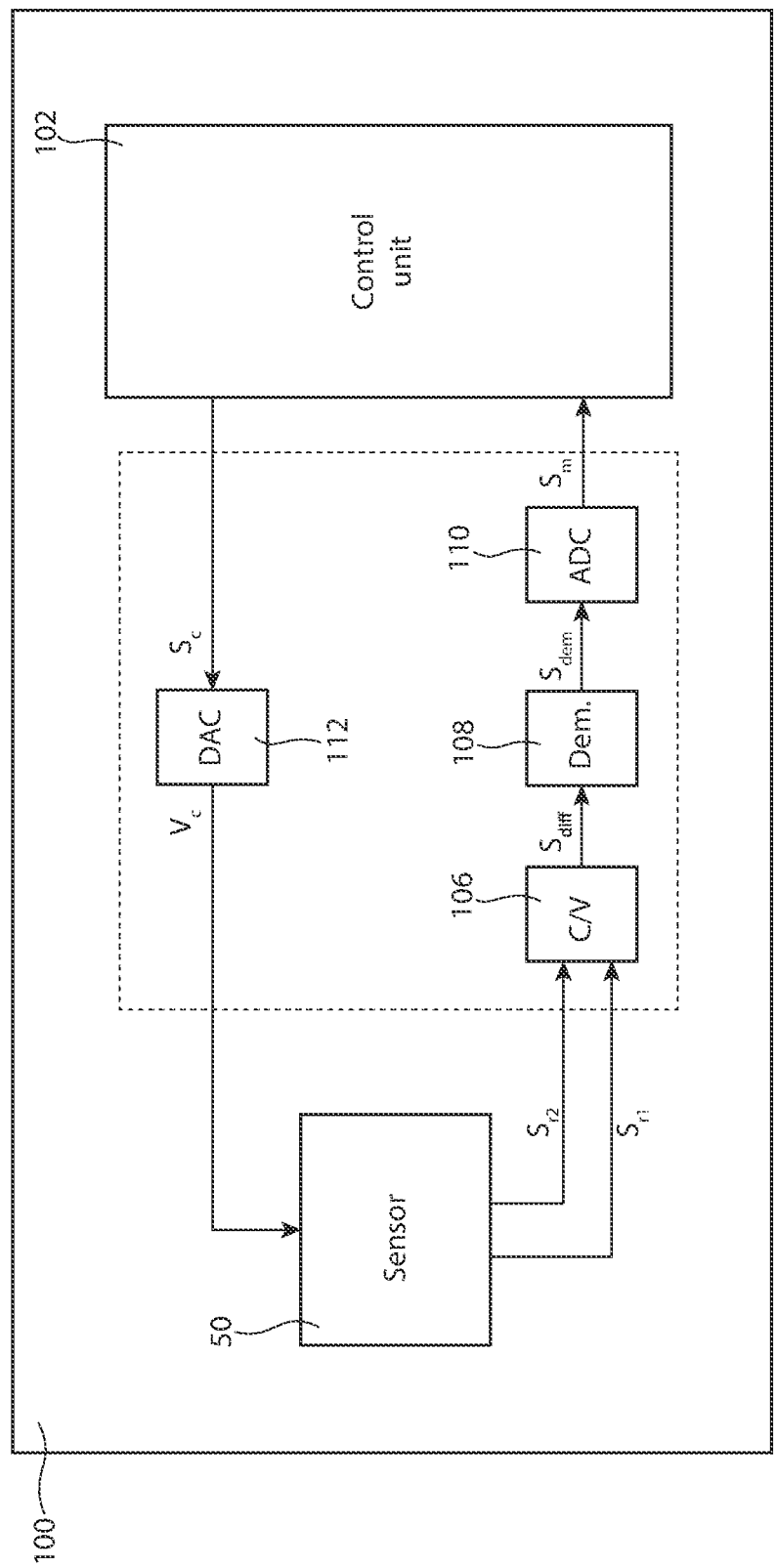
FIG. 2 is a block diagram of a measurement device comprising the micromechanical device, according to an embodiment.

In particular, the Figures are shown with reference to a triaxial Cartesian system defined by a first axis X, a second axis Y and a third axis Z, orthogonal to each other.

In the following description, elements common to the different embodiments have been indicated with the same reference numbers.

DETAILED DESCRIPTION

Figure 1:
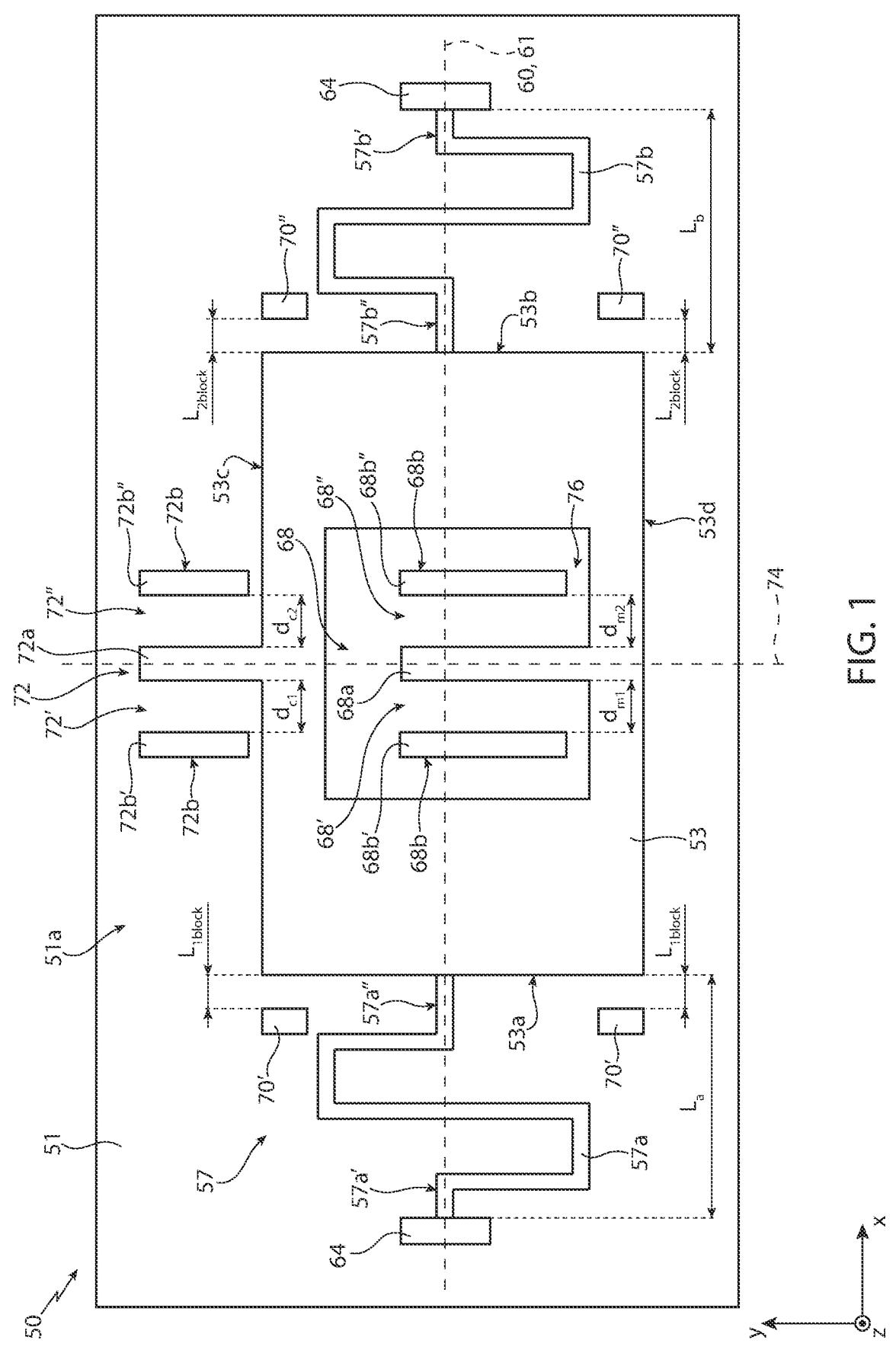

FIG. 1 shows a micromechanical device 50 configured to sense accelerations (hereinafter also referred to as sensor 50), according to an embodiment. FIG. 1 is a plan view (i.e., on an XY plane defined by the X and Y axes) of the sensor 50. FIG. 1 illustrates elements useful for understanding the present embodiment, and some elements or components are not shown although are present in the finished sensor.

The sensor 50 is exemplarily described herein as a uniaxial-type accelerometer (in detail, configured to sense accelerations along the X axis). However, it is apparent that the present description applies, in a similar manner, also to the case of biaxial or triaxial accelerometers.

The sensor 50, made using MEMS technology (i.e., by semiconductor manufacturing methods), comprises a semiconductor body 51 of semiconductor material such as silicon (Si), having a surface 51a extending parallel to the XY plane (i.e., the Z axis is orthogonal to the surface 51a). The sensor 50 further comprises a movable structure (or seismic mass) 53 having a mass M.

The seismic mass 53 is, for example, of semiconductor material (such as silicon or polysilicon) and extends parallel to the surface 51a of the semiconductor body 51, at a different height, along the Z axis, with respect to that of the surface 51a.

The seismic mass 53 is physically coupled to the semiconductor body 51 through a spring assembly 57 (in detail, a first spring, or first elastic element, 57a of the spring assembly 57 and a second spring, or second elastic element 57b of the spring assembly 57). The spring assembly 57 is, for example, of semiconductor material (such as silicon or polysilicon) and deforms (i.e., it elongates/shortens) exemplarily along the X axis. In other words, the spring assembly 57 has a deformation direction 60, wherealong the deformation occurs, which is parallel to the X axis and coincides with an oscillation direction 61 of the seismic mass 53 wherealong the latter oscillates in use.

In the embodiment exemplarily shown in FIG. 1, the first and the second springs 57a, 57b are serpentine springs. In particular, these serpentine springs are of planar type and made using MEMS technology (i.e., by semiconductor manufacturing methods). More in detail, such serpentine springs may include first portions, extending parallel to each other and to the Y axis, and second portions, extending parallel to each other and to the X axis. The first and the second portions are connected to each other and mutually arranged so as to form a serpentine path: each first portion is connected, at its ends (opposite to each other along the Y axis), to respective second portions; and each second portion is connected, at its ends (opposite to each other along the X axis), to respective first portions, except for two second portions (each arranged at a respective end of this path along the X axis and joined to a single respective first portion).

Each spring 57a, 57b of the spring assembly 57 has a respective first end 57a', 57b' and a respective second end 57a", 57b", opposite to each other along the X axis. In particular, the distance, measured along the X axis between the first end 57a' and the second end 57a" of the first spring 57a of the spring assembly 57, is identified with the reference $L_a$; the distance, measured along the X axis between the first end 57b' and the second end 57b" of the second spring 57b of the spring assembly 57, is identified with the reference $L_b$.

The springs 57a, 57b of the spring assembly 57 have a respective elastic constant (hereinafter referred to as partial elastic constant) $K_p$ having value exemplarily equal to each other. In the embodiment of FIG. 1, two springs 57a, 57b are exemplarily present, so that the elastic constant (hereinafter referred to as equivalent elastic constant) $K_{eq}$ of the spring assembly 57 has a value exemplarily equal to $2K_p$. In general, for any number N of springs of the spring assembly 57, the equivalent elastic constant $K_{eq}$ of the spring assembly 57 has a value exemplarily equal to $N \cdot K_p$. In detail, the partial elastic constants $K_p$ and the equivalent elastic constant $K_{eq}$ depend on the mechanical properties and on the number of springs of the spring assembly 57 and not on the mode wherein the sensor 50 is operated.

Each spring 57a, 57b of the spring assembly 57 is coupled, through the respective first end 57a', 57b', to a respective fixing element 64 coupled to the surface 51a of the semiconductor body 51 (in particular, each fixing element 64 is integral with the surface of the semiconductor body 51). Each spring 57a, 57b of the spring assembly 57 is also coupled, through the respective second end 57a", 57b", to the seismic mass 53. In detail, in the exemplarily discussed embodiment, the seismic mass 53 has a first and a second lateral surface 53a, 53b opposite to each other along the X axis, and each second end 57a", 57b" is integral with a respective one of the first and the second lateral surfaces 53a, 53b. Consequently, the first seismic mass 53 is interposed, along the X axis, between the first and the second springs 57a, 57b of the spring assembly 57.

Moreover, the seismic mass 53 includes one or more first measurement electrodes 68a (movable measurement electrodes), such as protrusions (for example having a substantially rectangular shape on the XY plane) which, in use, move integral with the seismic mass 53. FIG. 1 exemplarily shows the case wherein a first measurement electrode 68a is present, although the number of the first measurement electrodes 68a may be greater in further embodiments of the sensor 50.

One or more second measurement electrodes 68b (fixed measurement electrodes) are integral with the semiconductor body 51, in particular with the surface 51a. Each of the second measurement electrodes 68b is further divided into a first portion 68b' and a second portion 68b", physically and electrically separated from each other (in detail, connected to respective pads and biasable as better described hereinafter); the first measurement electrode 68a extends between the first portion 68b' and the second portion 68b". In greater detail, each of the first measurement electrodes 68a faces, and is interposed between, the first portion 68b' of a respective second measurement electrode 68b and the second portion 68b" of this respective second measurement electrode 68b. FIG. 1 exemplarily shows the case wherein a second measurement electrode 68b is present, although the number of the second measurement electrodes 68b may be greater in further embodiments of the sensor 50.

The first and the second measurement electrodes 68a, 68b form a measurement structure 68 (optional) of the sensor 50 for, in use, capacitively sensing displacements along the first axis X of the seismic mass 53; these displacements are indicative of external forces acting on the sensor 50 (e.g., due to accelerations applied to the sensor 50, i.e., whereto the sensor 50 is subject).

In particular, surfaces of the first measurement electrode 68a and of the first portion 68b' of the second measurement electrode 68b which are directly facing each other, form a first measurement capacitor 68; similarly, surfaces of the first measurement electrode 68a and of the second portion 68b" of the second measurement electrode 68b, directly facing each other, form a second measurement capacitor 68". The distance (along the X axis) between the first measurement electrode 68a and the first portion 68b' is indicated with the reference $d_{m1}$, while the distance between the first measurement electrode 68a and the second portion 68b" is indicated with the reference $d_{m2}$.

In the embodiment exemplarily considered in FIG. 1, the seismic mass 53 includes an accommodation through opening (alternatively, a cavity) 76 whereinto the first and second measurement electrodes 68a and 68b extend. In detail, the seismic mass 53 encloses and delimits the accommodation through opening 76 which traverses the seismic mass 53 transversely to the surface 51a of the semiconductor body 51. The first and second portions 68b' and 68b" of the second measurement electrode 68b extend into the accommodation through opening 76 and the first measurement electrode 68a protrudes into the accommodation through opening 76 and extends between the first and second portions 68b' and 68b" of the second measurement electrode 68b.

Moreover, the seismic mass 53 includes one or more first control electrodes 72a (movable control electrodes), such as protrusions (for example having a substantially rectangular shape on the XY plane) which, in use, move integral with the seismic mass 53. FIG. 1 exemplarily shows the case wherein a first control electrode 72a is present, although the number of the first control electrodes 72a may be greater in further embodiments of the sensor 50.

One or more second control electrodes 72b (fixed control electrodes) are integral with the semiconductor body 51, in particular with the surface 51a. Each of the second control electrodes 72b is further divided into a first portion 72b' and a second portion 72b", separate from each other; the first control electrode 72a extends between the first portion 72b' of a respective second control electrode 72b and the second portion 72b" of the respective second control electrode 72b. In greater detail, each of the first control electrodes 72a faces, and is interposed between, the first portion 72b' of a respective second control electrode 72b and the second portion 72b" of this respective second control electrode 72b. FIG. 1 exemplarily shows the case wherein a second control electrode 72b is present, although the number of the second control electrodes 72b may be greater in further embodiments of the sensor 50.

The first and the second control electrodes 72a, 72b form a control structure 72 of the sensor 50 for, in use, capacitively controlling the operation of the sensor 50, as better discussed hereinafter.

In particular, surfaces of the first control electrode 72a and of the first portion 72b' of the second control electrode 72b which are directly facing each other, form a first control capacitor 72; similarly, surfaces of the first control electrode 72a and of the second portion 72b" of the second control electrode 72b, directly facing each other, form a second control capacitor 72". The distance (along the X axis) between the first control electrode 72a and the first portion 72b' of the second control electrode 72b is indicated with the reference $d_{c1}$, while the distance between the first control electrode 72a and the second portion 72b" of the second control electrode 72b is indicated with the reference $d_{c2}$.

In the embodiment exemplarily considered in FIG. 1, the seismic mass 53 has a third and a fourth lateral surface 53c and 53d which are opposite to each other along the Y axis and which join to each other the first and the second lateral surfaces 53a and 53b, and the control electrodes 72a and 72b face one of the third and the fourth lateral surfaces 53c and 53d (here the third lateral surface 53c is exemplarily considered). In other words, the portions 72b' and 72b" of the second control electrode 72b face the third lateral surface 53c and the first control electrode 72a protrudes, from the third lateral surface 53c, so as to extend between the portions 72b' and 72b" of the second control electrode 72b.

Moreover, optionally, first and second blocking elements 70', 70" are integral with the semiconductor body 51 (in particular, with the surface 51a of the semiconductor body 51). FIG. 1 exemplarily illustrates two blocking elements 70' which are distant from the first lateral surface 53a of the seismic mass 53 by a distance $L_{1block}$ along the first axis X; FIG. 1 also illustrates two blocking elements 70" which are distant from the second lateral surface 53b of the seismic mass 53 by a distance $L_{2block}$ along the first axis X.

In detail, in order to avoid a direct contact between the first measurement electrode 68a and the portions 68b', 68b" of the second measurement electrode 68b and between the first control electrode 72a and the portions 72b', 72b" of the second control electrode 72b, the distance $d_{m1}$ is designed with a value such that $d_{m1} > L_{1block}$ and $d_{c1} > L_{1block}$, and the distance $d_{m2}$ is designed with a value such that $d_{m2} > L_{2block}$ and $d_{c2} > L_{2block}$.

In greater detail, in a rest condition of the sensor 50 wherein the seismic mass 53 is not subject to accelerations along the oscillation direction 61, the sensor 50 has axial symmetry with respect to a centerline 74 orthogonal to the oscillation direction 61 and parallel to the surface 51a (in particular, parallel to the Y axis) and passing through a center (e.g., barycenter, not shown) of the seismic mass 53. In other words, in the rest condition of the sensor 50, for example, the relationships $d_{m1}=d_{m2}$, $d_{c1}=d_{c2}$, $L_{1block}=L_{2block}$ and $L_a=L_b$ apply. For example, the relationship $d_{m1}=d_{m2}=d_{c1}=d_{c2}$ applies.

During the use of the sensor 50, the measurement structure 68 capacitively senses the displacements of the seismic mass 53 along the oscillation direction 61.

In detail, the seismic mass 53 (also called rotor; and therefore the first measurement electrode 68a which is a part thereof) is biased in a per se known manner with a bias signal (in particular a first bias voltage V1, for example being square wave-shaped). The first bias voltage V1 oscillates, around an effective value of the bias voltage, at a bias frequency (or rotor frequency) $f_{rot}$ greater than a mechanical resonance frequency $f_{res}$ of the sensor 50. In greater detail, the bias frequency $f_{rot}$ is at least one order of magnitude greater than the mechanical resonance frequency $f_{res}$ (e.g., $f_{rot}$~10-300 kHz and $f_{res}$~1-10 kHz), so that the mechanical properties of the seismic mass 53 (e.g., its motion) are not affected by the first bias voltage V1. For example, the first bias voltage V1 is provided from the outside (e.g., by a bias apparatus of a known type) to sensor pads, not shown and present on the surface 51a of the semiconductor body 51, and is carried by these pads to the seismic mass 53 through one or more conductive paths defined for example by conductive tracks electrically connected to the seismic mass through the fixing elements 64 and the springs 57a and 57b.

In addition to biasing the first measurement electrode 68a to the first bias voltage V1, the portions 68b' and 68b" of the second measurement electrode 68b are biased to respective second bias voltages V2' and V2", in particular of direct type (DC). Generally, the second bias voltages V2' and V2" coincide with each other (V2'=V2") and are equal to the effective value of the first bias voltage V1; this is the case exemplarily considered hereinafter. Nevertheless, it is also possible to have V2'≠V2" (in detail, providing the respective pads electrically connected to the portions 68b' and 68b" of the second measurement electrode 68b with the respective second bias voltages V2' and V2" different from each other).

In use, the sensor 50 is subject to an acceleration along the oscillation direction 61 (oscillation condition of the sensor 50, alternative to the rest condition), which generates an external force acting on the seismic mass 53 and causes it to oscillate along the oscillation direction 61 with respect to a rest position thereof; consequently, the springs 57a and 57b contract and elongate alternately to each other (i.e., $L_a \neq L_b$) due to the contraction and elongation forces exerted thereon by the seismic mass 53. Consequently, the distances $d_{m1}$, $d_{m2}$ vary as a function of the external force applied to the sensor 50: it is therefore possible to correlate in a known manner the respective capacitance variations of the measurement capacitors 68', 68" (acquired owing to the previously described biasing of the seismic mass 53) to this external force applied. In particular, a difference between the respective capacitance variations of the measurement capacitors 68', 68" is zero in the rest condition of the sensor 50 (unless a possible measurement noise occurs that is not considered here) and is different from zero in the oscillation condition of the sensor 50. The capacitance measurements may be carried out through techniques known per se, for example through transimpedance amplifiers.

Moreover, during the use of the sensor 50, the control structure 72 capacitively controls the displacements of the seismic mass 53 along the oscillation direction 61, as better described hereinafter. In particular, the capacitive control occurs because of the known spring softening effect: by applying a control voltage $V_c$ variable over time (i.e., a voltage difference between the first and the second control electrodes 72a and 72b, variable over time) to the control structure 72, a respective variation over time of a total elastic constant $K_t$ of the sensor 50 occurs.

In detail, the total elastic constant $K_t$ is indicative of the stiffness of the sensor 50 (in detail, of the oscillating assembly comprising the seismic mass 53, the spring assembly 57, the control structure 72 and, optionally, the measurement structure 68) and is a function both of the mechanical properties of the sensor 50 (e.g., stiffness and number of springs of the spring assembly 57) and of the electrical bias state of the sensor 50 (e.g., of the electrical state of the measurement structure 68 and of the control structure 72). In greater detail, the total elastic constant $K_t$ is equal to the equivalent elastic constant $K_{eq}$ of the spring assembly 57 (constant over time and indicative of the structure and mechanical properties of the spring assembly 57) minus a first variation $\Delta K_{contr}$ of the total elastic constant (variable over time and relating to the softening provided by electrically biasing the control structure 72) and a second variation $\Delta K_{mis}$ of total elastic constant (constant over time and relating to the softening provided by electrically biasing the measurement structure 68). In other words, $K_t = K_{eq} - \Delta K_{contr} - \Delta K_{mis}$, with $\Delta K_{contr} = \Delta K_{contr}(t)$. The second variation $\Delta K_{mis}$ of total elastic constant is considered here as constant over time since $f_{rot} >> f_{res}$ and therefore the oscillation over time of the first bias voltage V1 around its effective value does not generate any perceptible time-variable effect at the work frequencies of the sensor 50 (generally lower than the resonance frequency $f_{res}$).

In particular, the second control electrodes 72b are biased so as to have this control voltage difference $V_c$ with respect to the first control electrode 72a (biased instead to the first bias voltage V1 as part of the seismic mass 53): in greater detail, a third voltage V3 (or total control voltage, not shown and generated in a known manner) is applied to the second control electrodes 72b and is equal to the sum of the effective value of the first bias voltage V1 and the control voltage difference $V_c$ to be provided (i.e., $V3=V_c+V1$) so that, when biased, between the control electrodes 72a and 72b there exists this control voltage difference $V_c$ having a value variable over time. The control voltage difference $V_c$ varies between a first value $V_{c1}$ (in detail, zero) and a second value $V_{c2}$ (greater than, or equal to, the first value $V_{c1}$, and variable and determined as better described hereinafter) with a frequency equal to a control frequency $f_c$. The control frequency $f_c$ is generally lower than the resonance frequency $f_{res}$ by about an order of magnitude and therefore is exemplarily in the order of a hundred Hz, for example it is equal to about 100-200 Hz. When the control voltage difference $V_c$ assumes the first value $V_{c1}$ that is zero, no attraction force is generated between the control electrodes 72a and 72b and therefore the control structure 72 does not generate any softening effect and the total elastic constant $K_t$ assumes a first value $K_{t1}$ equal to $K_{eq} - \Delta K_{mis}$; when instead the control voltage difference $V_c$ assumes the second value $V_{c2}$ (exemplarily considering the case $V_{c1} \neq V_{c2}$), an attraction force is generated between the control electrodes 72a and 72b (i.e., the control structure 72 contributes to the softening effect) and the total elastic constant $K_t$ assumes a second value $K_{t2}$ lower than the first value $K_{t1}$ and equal to $K_{eq} - \Delta K_{contr} - \Delta K_{mis}$ (with $\Delta K_{mis} \neq 0$ N/m). In other words, if any, the attraction force is generated between the second control electrodes 72b (fixed to the semiconductor body 51 and operating as stators) and the first control electrode 72a (fixed to the seismic mass 53 and operating as a rotor configured to oscillate along the oscillation direction 61 with respect to the semiconductor body 51) and acts parallel to the oscillation direction 61 causing the reduction of the total elastic constant $K_t$ of the sensor 50.

In fact, the following relationships apply:

$$f_{res} = \frac{1}{2\pi} \sqrt{\omega_0^2 - \frac{\epsilon A}{M \cdot d^3} \cdot V_c^2}$$

$$FSR \propto f_{res}^2$$

$$sens \propto 1/f_{res}^2$$

Where $V_c$ is the control voltage difference, $f_{res}$ is the resonance frequency of the sensor 50 also depending on the control voltage difference $V_c$, is a reference resonance pulse of the sensor 50 in the absence of the control voltage difference $V_c$ (i.e., it takes into account the equivalent elastic constant $K_{eq}$ and the second variation $\Delta K_{mis}$ of total elastic constant, but not the first variation $\Delta K_{contr}$ of total elastic constant), is the absolute electrical permittivity of the insulator present in the control capacitors 72' and 72" (here air or vacuum), A is the area of the surfaces of the control electrodes 72a and 72b which face each other to form the control capacitors 72' and 72", M is the mass of the seismic mass 53, d is the distance between the surfaces of the control electrodes 72a and 72b which face each other to form the control capacitors 72' and 72" (e.g., $d=d_{c1}=d_{c2}$), FSR is the full scale range of the sensor 50 and sens is the sensitivity of the sensor 50. It is therefore apparent that the resonance frequency $f_{res}$ decreases, with respect to a reference value thereof corresponding to the reference resonance pulse, when a non-zero value of the control voltage difference $V_c$ is applied between the control electrodes 72a and 72b. Moreover, the reduction in the resonance frequency $f_{res}$ causes a respective reduction in the FSR and a respective increase in sensitivity. Moreover, the same mathematical relationship defining the resonance frequency $f_{res}$ may also be equivalently written in the following two manners:

$$f_{res} = \frac{1}{2\pi}\sqrt{\frac{K_{eq} - \Delta K_{contr} - \Delta K_{mis}}{M}}$$

$$f_{res} = \frac{1}{2\pi}\sqrt{\omega_0^2 - \frac{\epsilon A_{mis}}{M \cdot d_{mis}^3}\cdot(V_2 - V_1)^2 - \frac{\epsilon A_{contr}}{M \cdot d_{contr}^3}\cdot V_c^2}$$

Where $A_{mis}$ is the area of the surfaces of the measurement electrodes 68a and 68b which face each other to form the measurement capacitors 68' and 68", $d_{mis}$ is the distance between the surfaces of the measurement electrodes 68a and 68b which face each other to form the measurement capacitors 68' and 68", $A_{contr}$ here is the area of the surfaces of the control electrodes 72a and 72b which face each other to form the control capacitors 72' and 72", $d_{contr}$ is the distance between the surfaces of the control electrodes 72a and 72b which face each other to form the control capacitors 72' and 72".

In particular, when it is in the oscillation condition, the sensor 50 is operable in a first operating mode through the first value $V_{c1}$ of the control voltage difference $V_c$ (first state of the control structure 72, with $V_{c1}=0V$) or in a second operating mode through the second value $V_{c2}$ of the control voltage difference $V_c$ (second state of the control structure 72, with $V_{c2} \neq 0V$). When the control structure 72 is controlled thorough the first value $V_{c1}$ of the control voltage difference $V_c$ in its first state, the sensor 50 is in the first operating mode and has the first value of the total elastic constant $K_t$, while when the control structure 72 is controlled through the second value $V_{c2}$ of the control voltage difference $V_c$ in its second state, the sensor 50 is in the second operating mode and generally has the second value of the total elastic constant $K_t$ (except in the case $V_{c2}=0V$ wherein it has the first value of the total elastic constant $K_t$).

As shown in FIG. 2, the sensor 50 is comprised in a measurement device 100 configured to measure accelerations acting along the oscillation direction 61 (i.e., parallel to the X axis). In detail, the measurement device 100 implements a control method (better discussed hereinafter with reference to FIG. 4 and indicated with the reference 150) which allows the sensor 50 to be controlled in order to measure these accelerations in an optimized manner.

In detail, the measurement device 100 comprises a control unit 102 electrically coupled to the sensor 50 to control the latter and to sense the accelerations along the oscillation direction 61 whereto it is subject. In greater detail, the control unit 102 receives a measurement signal $S_m$ indicative of the acceleration sensed by the sensor 50 and generates a control signal $S_c$ for controlling the sensor 50.

Optionally, the measurement device 100 also comprises an interface unit 104 electrically coupled to the sensor 50 and to the control unit 102 to interface them with each other. The interface unit 104 comprises a C/V (capacitance to voltage) conversion block 106, a demodulation block 108, an analog to digital conversion, ADC, block 110 and a digital to analog conversion, DAC, block 112.

The C/V conversion block 106 (e.g., provided through a transimpedance amplifier) is electrically coupled to the measurement structure 68 and in use receives a first sensing signal $S_{r1}$ and a second sensing signal $S_{r2}$ from the measurement structure 68 of the sensor 50. The first and the second sensing signals $S_{r1}$, $S_{r2}$ are electrical signals (e.g., current signals) indicative of the capacitances of the first and, respectively, the second measurement capacitors 68', 68". The C/V conversion block 106 generates, on the basis of the difference between the first sensing signal $S_{r1}$ and the second sensing signal $S_{r2}$, a differential signal (or differential voltage) $S_{diff}$ (e.g., a voltage signal) indicative of the acceleration sensed by the sensor 50.

The demodulation block 108 receives the differential signal $S_{diff}$ from the C/V conversion block 106 and generates a demodulated signal (or demodulated voltage) $S_{dem}$ through demodulation of the differential signal $S_{diff}$, in a per se known manner. In particular, the differential signal $S_{diff}$ has a first component ($S_{o1}=S_{dem}$) at the control frequency $f_c$ and a second component ($S_{o2}$) at the bias frequency $f_{rot}$. The first component $S_{o1}$ is due to the control of the control structure 72 through the control signal $S_c$ (the corresponding digital signal of the control voltage difference $V_c$, therefore also at the control frequency $f_c$), while the second component $S_{o2}$ is due to the biasing of the seismic mass 53 through the first bias voltage V1 at the bias frequency $f_{rot}$. In other words, $S_{diff}=S_{o1}+S_{o2}$. Consequently, the demodulation block 108 removes the second component $S_{o2}$ at the bias frequency $f_{rot}$ from the differential signal $S_{diff}$ to generate the demodulated signal $S_{dem}$ at the control frequency $f_c$, indicative only of the sensed acceleration and not of the driving modulation (rotor signal modulation) of the sensor 50.

The ADC block 110 receives the demodulated signal $S_{dem}$ and converts it from an analog signal to a digital signal in a per se known manner, thus generating at output the measurement signal $S_m$ which is received by the control unit 102.

The control unit 102 receives at input the measurement signal $S_m$ indicative of the measured acceleration and generates at output, as better described hereinafter, the control signal $S_c$ configured to control the operation of the sensor 50. The control signal $S_c$ is the corresponding digital signal of the control voltage difference Vc of analog type.

The DAC block 112 receives the control signal $S_c$ and converts it from a digital signal to an analog signal in a per se known manner, generating at output the control voltage difference $V_c$ to be applied between the first and the second control electrodes 72a and 72b. In detail, the control voltage difference $V_c$ is a square wave with a duty cycle exemplarily equal to 50%. In greater detail, an adder block (not shown and connected between the DAC block 112 and the second control electrodes 72b) may receive at input the control voltage difference $V_c$ and the first bias voltage V1 and add them to each other to generate the third voltage V3 whereto biasing the second control electrodes 72b.

Figure 3A:
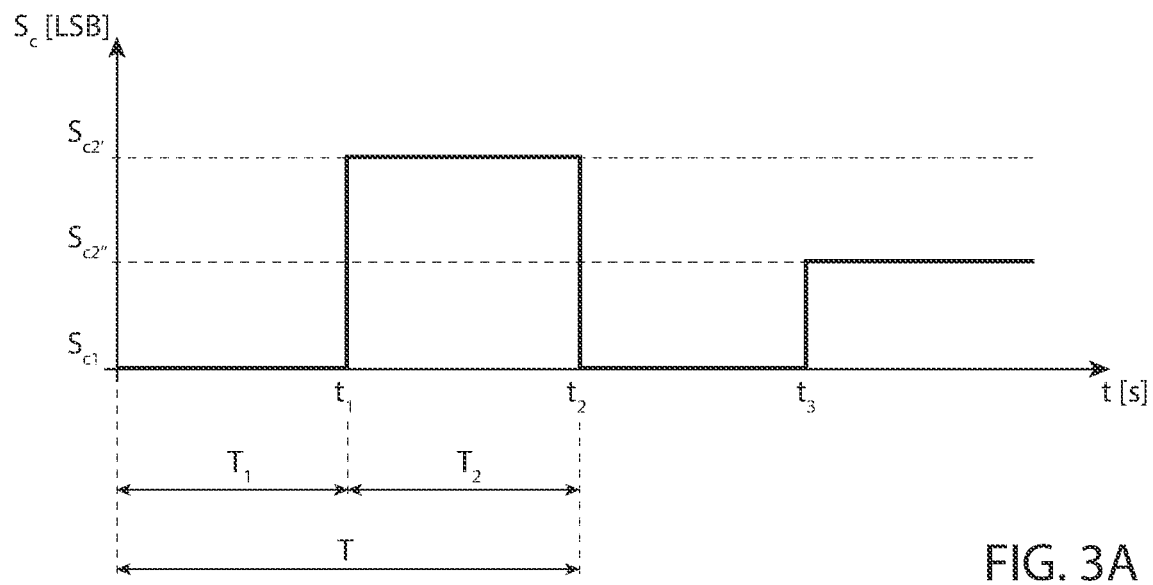
FIGS. 3A-3E are graphs of electrical signals generated by the measurement device of FIG. 2.
Figure 3B:
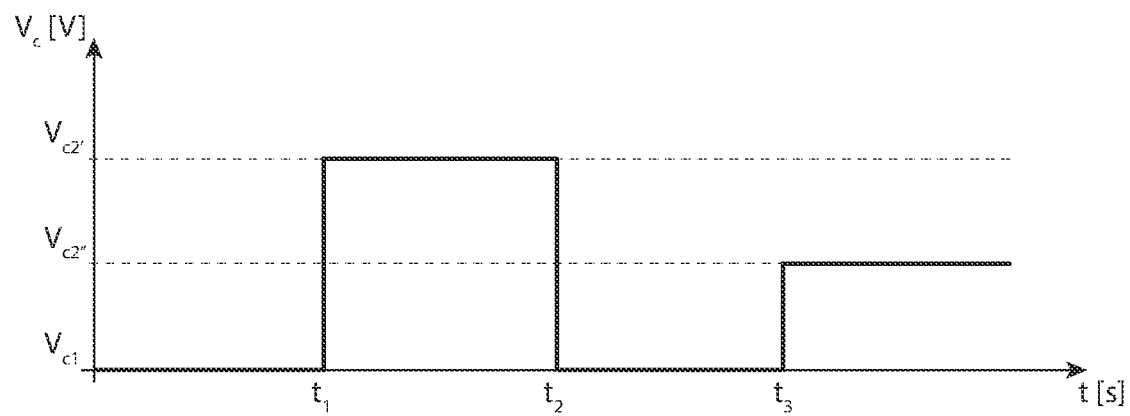
Figure 3C:
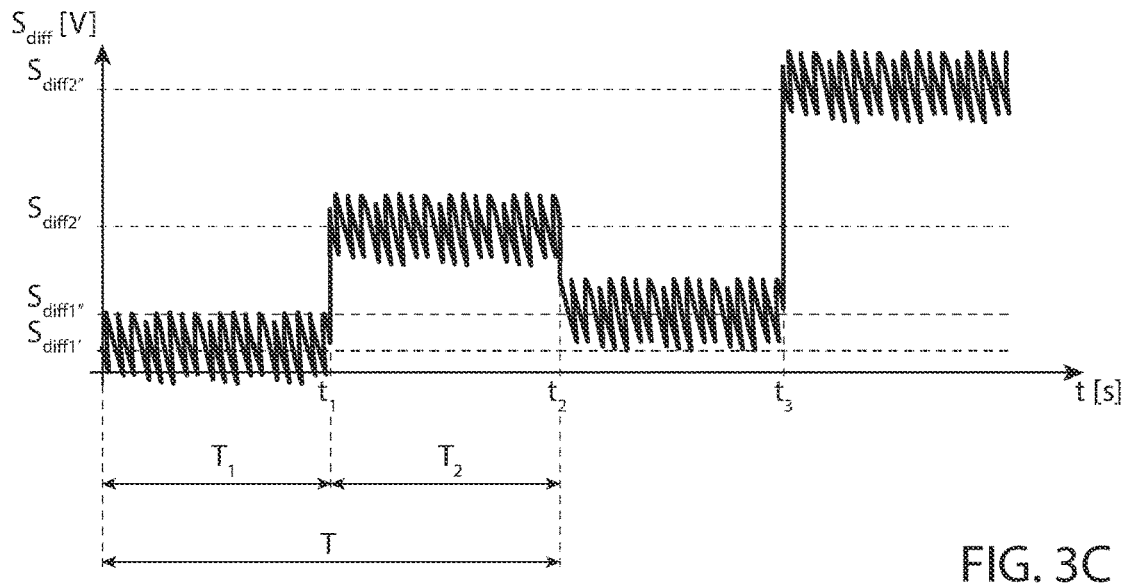
Figure 3D:
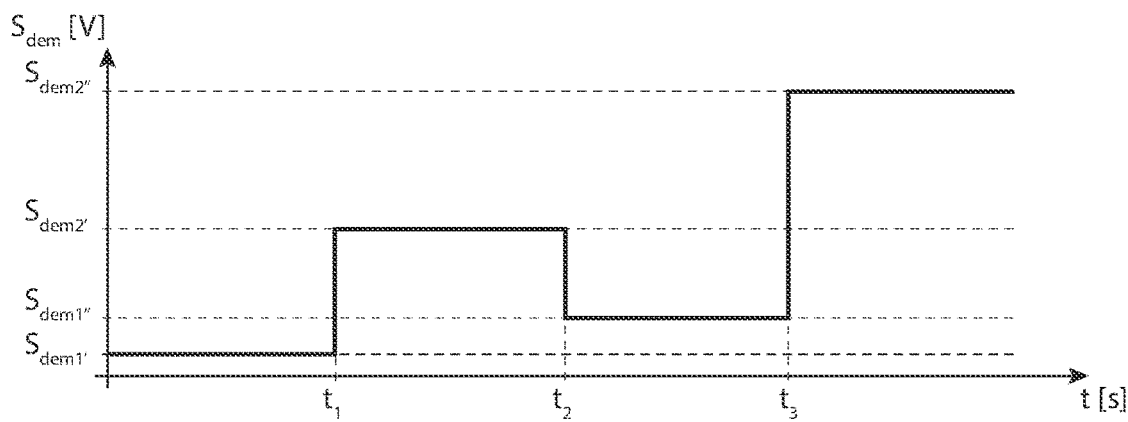
Figure 3E:
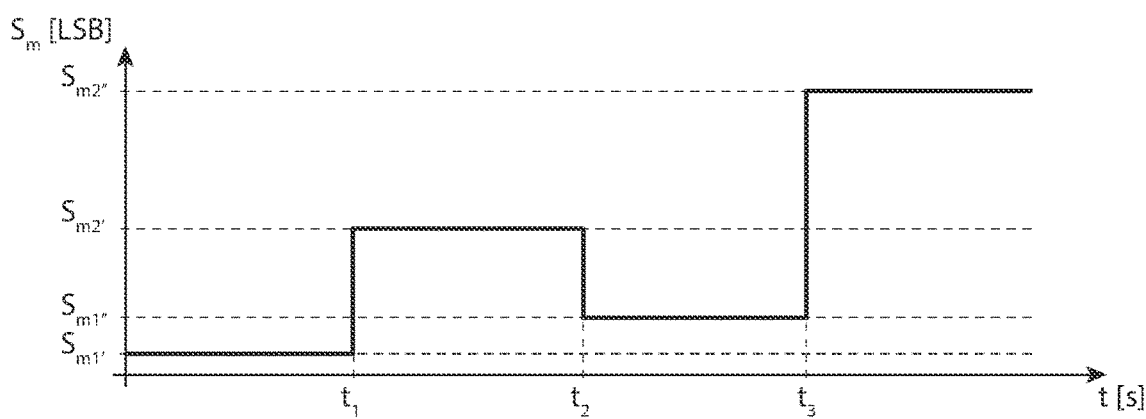

For exemplary and illustrative purposes, an example of the control signal $S_c$ is shown in FIG. 3A and an example of the control voltage difference $V_c$ is shown in FIG. 3B. Moreover, an example of the differential signal $S_{diff}$ is shown in FIG. 3C, an example of the demodulated signal $S_{dem}$ is shown in FIG. 3D, and an example of the measurement signal $S_m$ is shown in FIG. 3E. Purely by way of example, FIGS. 3A-3E are shown in several periods T (with $T=1/f_c$). Moreover, purely by way of example, FIGS. 3A-3F refer to the case wherein the measured acceleration is lower in a first period and greater in a second period consecutive to the first period (i.e., it switches from a respective first value at $t<t_2$ to a respective second value greater than the first value at $t \geq t_2$).

In particular, it may be seen how, at each period T, the control signal $S_c$ assumes a first value $S_{c1}$ in a first time interval $T_1$ of the period T and assumes a second value $S_{c2}$ in a second time interval $T_2$ of the period T, with $T_1+T_2=T$. Hereinafter, the case wherein $T_1=T_2=T/2$, i.e., a duty cycle equal to 50% and a variation frequency of the control signal $S_c$ equal to $2f_c$, is exemplarily considered, although different cases may be similarly considered. In particular, the first value $S_{c1}$ is a predefined value (in detail, it is zero) and the second value $S_{c2}$ is determined by the control unit 102 and is variable as the period T considered varies. For example, the control signal $S_c$ is shown in FIG. 3A in two consecutive periods T and it may be seen how the second value $S_{c2}$ is different in the two periods (for this reason it is indicated in FIG. 3A with the references $S_{c2'}$ and $S_{c2''}$).

The control voltage difference $V_c$ shown in FIG. 3B is the corresponding analog signal of the control signal $S_c$, and at each period T it assumes said first value $V_{c1}$ (a predefined and, in particular, zero value) in the first time interval $T_1$ and assumes said second value $V_{c2}$ (function of the second value $S_{c2}$) in the second time interval $T_2$.

The differential signal $S_{diff}$ shown in FIG. 3C oscillates at the bias frequency $f_{rot}$, at each period T, around a respective first average value $S_{diff1}$ in the first time interval $T_1$ and around a respective second average value $S_{diff2}$ in the second time interval $T_2$. In the exemplarily considered case wherein the sensed acceleration increases at instant $t_2$, the first average value $S_{diff1'}$ at $t<t_2$ is lower than the first average value $S_{diff1''}$ at $t \geq t_2$. Moreover, at each period T the second average value $S_{diff2}$ is indicative of an acceleration measurement more accurate with respect to that of the respective first average value $S_{diff1}$, as better explained hereinafter. In general (i.e., unless the case $V_{c2}=0V$ occurs, wherein they coincide), at each period T the second average value $S_{diff2}$ in the second time interval $T_2$ is greater than the first average value $S_{diff1}$ in the first time interval $T_1$ because the measurement in the second time interval $T_2$ is performed at a greater sensitivity and lower full scale range than that of the first time interval $T_1$.

The demodulated signal $S_{dem}$ shown in FIG. 3D is equal to the difference between the differential signal $S_{diff}$ and the second component $S_{o2}$ oscillating at the bias frequency $f_{rot}$ (possibly, further cleaned of the measurement noise) and assumes, at each period T, a respective first value $S_{dem1}$ in the first time interval $T_1$ and a respective second value $S_{dem2}$ in the second time interval $T_2$, generally greater than the first value $S_{dem1}$.

The measurement signal $S_m$ shown in FIG. 3E is the corresponding digital signal of the demodulated signal $S_{dem}$, and at each period T it assumes a respective first value $S_{m1}$ (indicative of the first value $S_{dem1}$) in the first time interval $T_1$ and assumes a respective second value $S_{m2}$ (indicative of the second value $S_{dem2}$) in the second time interval $T_2$.

Figure 4:
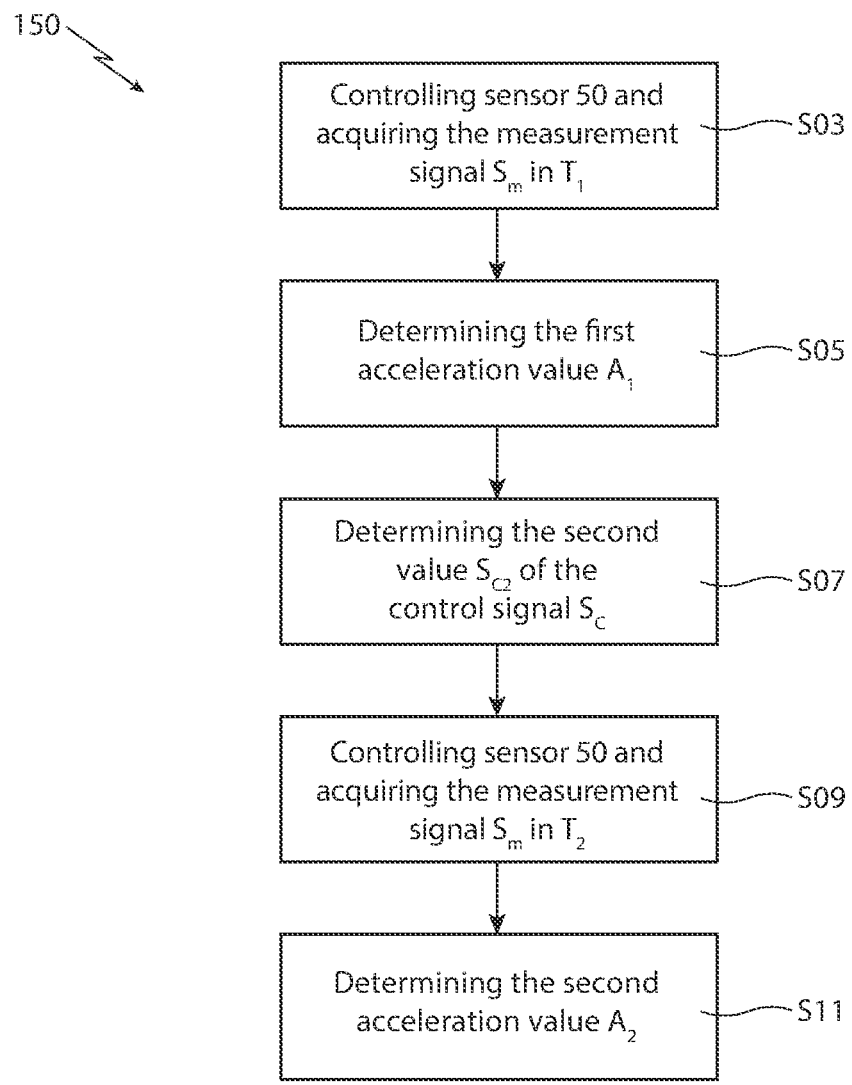
FIG. 4 is a block diagram of a control method of the measurement device of FIG. 2.

The control method 150 is now discussed with reference to FIG. 4.

The control method 150 is performed in an iterative manner: hereinafter a single iteration corresponding to a respective period T is exemplarily described, but what described is similarly applicable to the case of several consecutive iterations by repeating the steps described hereinafter.

At a step S03 of the control method 150, in the first time interval $T_1$ the control unit 102 controls the sensor 50 with the first value $S_{c1}$ of the control signal $S_c$ (i.e., with said predefined value, in detail with $S_c=0$ LSB) thus operating the control structure 72 in the first state and setting the sensor 50 to said first operating mode wherein the total elastic constant $K_t$ assumes the first value. Moreover, in the first time interval $T_1$ the control unit 102 acquires the first value $S_{m1}$ of the measurement signal $S_m$. The measurement signal $S_m$ in the first time interval $T_1$ is therefore indicative of the acceleration sensed by the sensor 50 in the absence of the control signal $S_c$ (i.e., with $S_c$ and $V_c$ being zero); in other words it is indicative of a first acceleration value $A_1$ which is a first measurement of the acceleration whereto the sensor 50 is subject, performed when the sensor 50 has the maximum value of total elastic constant $K_t$ and therefore the maximum full scale range and the minimum sensitivity. In detail, the acquisition of the measurement signal $S_m$ is performed simultaneously with the control of the sensor 50 through the first value $S_{c1}$ of the control signal $S_c$. The first value $S_{m1}$ of the measurement signal $S_m$ is determined in a per se known manner and, for example, is an instantaneous value of the measurement signal $S_m$ in the first time interval $T_1$ or is an average of the values that the measurement signal $S_m$ assumes in the first time interval $T_1$. In greater detail, the control of the sensor 50 and the acquisition of the measurement signal $S_m$ are performed as previously described with reference to the interface unit 104, i.e., by biasing the control structure 72 with the control voltage difference $V_c$ generated as a function of the first value $S_{c1}$ of the control signal $S_c$ by the DAC block 112, acquiring the first and the second sensing signals $S_{r1}$ and $S_{r2}$ from the measurement structure 68, generating the differential voltage $S_{diff}$ as a function of the sensing signals $S_{r1}$ and $S_{r2}$ by the C/V conversion block 106, generating the demodulated voltage $S_{dem}$ as a function of the differential voltage $S_{diff}$ by the demodulation block 108 and generating the first value $S_{m1}$ of the measurement signal $S_m$ as a function of the demodulated voltage $S_{dem}$ by the ADC block 110.

At a step S05 consecutive to step S03, the control unit 102 determines the first acceleration value $A_1$ as a function of the first value $S_{m1}$ of the measurement signal $S_m$. The first acceleration value $A_1$ is calculated in a known manner, for example through a lookup table that correlates each first value $S_{m1}$ of the measurement signal $S_m$ to a respective measured acceleration value or through the mathematical formula $A_1=S_{m1}/\text{sens}_1$ (where sense is the minimum sensitivity that the sensor 50 may have).

At a step S07 consecutive to step S05, the control unit 102 determines the second value $S_{c2}$ of the control signal $S_c$ as a function of the first acceleration value $A_1$ that is measured. In particular, the second value $S_{22}$ of the control signal $S_c$ is inversely proportional to the first acceleration value $A_1$. When the first acceleration value $A_1$ is equal to a maximum acceleration value measurable by the sensor 50 (thus coinciding with the upper end of the full scale range of the sensor 50, and for example equal to about 32 G), the second value $S_{c2}$ of the control signal $S_c$ is zero ($S_{c2,min}=0$ LSB); when the first acceleration value $A_1$ is equal to a minimum acceleration value measurable by the sensor 50 (thus coinciding with the lower end of the full scale range of the sensor 50, i.e., with the lower limit of measured acceleration underneath which the sensor 50 is maximally softened, for example equal to about 2 G), the second value $S_{c2}$ of the control signal $S_c$ is maximum ($S_{c2,max}$, corresponding, in a per se known manner through the control chain, to a respective maximum second value $V_{c2}$ of the control voltage difference $V_c$ comprised between about 1V and about 10V); when the first acceleration value $A_1$ is comprised between the minimum value and the maximum value of acceleration measurable by the sensor 50, the second value $S_{c2}$ of the control signal $S_c$ is comprised between its minimum value $S_{c2,min}$ and its maximum value $S_{c2,max}$ (and for example it varies in a linear manner with the first acceleration value $A_1$). For example, the second value $S_{c2}$ of the control signal $S_c$ is determined through a lookup table which correlates each measurable first acceleration value $A_1$ to a respective second value $S_{c2}$ of the control signal $S_c$.

At a step S09 consecutive to step S07, in the second time interval $T_2$ the control unit 102 controls the sensor 50 with the second value $S_{c2}$ of the control signal $S_c$. Consequently, the control structure 72 is operated in the second state and the sensor 50 is set to said second operating mode wherein, unless the second value $S_{c2}$ of the control signal $S_c$ is zero, the total elastic constant $K_t$ assumes the second value which is lower than the first value. Moreover, in the second time interval $T_2$ the control unit 102 acquires the second value $S_{m2}$ of the measurement signal $S_m$. Except for the case $S_{c2}=0$ LSB corresponding to the situation wherein the first acceleration value $A_1$ is equal to the maximum acceleration value measurable by the sensor 50 (situation which, for the use of the sensor 50 in practical circumstances, generally does not occur since it would imply the measurement of an acceleration equal to or greater than the upper end of the full scale range of the sensor 50), the measurement signal $S_m$ in the second time interval $T_2$ is therefore indicative of the acceleration sensed by the sensor 50 in the presence of the control signal $S_c$; in other words it is indicative of a second acceleration value $A_2$ which is a second measurement of the acceleration whereto the sensor 50 is subject, performed when the sensor 50 does not have the maximum value of equivalent elastic constant $K_{eq}$ and therefore has a lower full scale range and a greater sensitivity with respect to the first measurement previously performed. In detail, the acquisition of the measurement signal $S_m$ is performed simultaneously with the control of the sensor 50 through the second value $S_{c2}$ of the control signal $S_c$. The second value $S_{m2}$ of the measurement signal $S_m$ is determined in a per se known manner and, for example, is an instantaneous value of the measurement signal $S_m$ in the second time interval $T_2$ or is an average of the values that the measurement signal $S_m$ assumes in the second time interval $T_2$. In greater detail, the control of the sensor 50 and the acquisition of the measurement signal $S_m$ are performed as previously described with reference to the interface unit 104.

At a step S11 consecutive to step S09, the control unit 102 determines the second acceleration value $A_2$ as a function of the second value $S_{m2}$ of the measurement signal $S_m$. The second acceleration value $A_2$ is calculated in a known manner and similarly to what has been previously described for the first acceleration value $A_1$, for example through the mathematical formula $A_2=S_{m2}/sens_2$ (where $sens_2$ is the sensitivity of the sensor 50 in the second time interval $T_2$, determined, for example through a further lookup table, on the basis of the first acceleration value $A_1$ so as to be inversely proportional to the latter), or through a lookup table that correlates, as a function of the sensitivity used in the second time interval $T_2$, each second value $S_{m2}$ of the measurement signal $S_m$ to a respective value of measured acceleration.

The second acceleration value $A_2$ therefore represents a measurement of the acceleration whereto the sensor 50 is subject which is performed with a greater sensitivity than that of the first time interval $T_1$. Consequently, the final acceleration value measured at the iteration corresponding to the period T is equal to the second acceleration value $A_2$. In other words, optionally at each iteration the control unit 102 also generates (consecutively to step S11) an output signal which is indicative of the final measured acceleration value and which, in greater detail, has a value at the considered period T that is indicative of the second acceleration value $A_2$. For example, the output signal may be used to control one or more functionalities of an external apparatus operatively coupled to the measurement device 100 and not forming part of the present disclosure.

The control method 150 allows the acceleration whereto the sensor 50 is subject to be periodically sensed (in detail, the sensing occurs at the control frequency $f_c$). In particular, this occurs by performing a multiplicity of iterations of the control method 150, thus obtaining a respective multiplicity of acceleration measurements ($A_2$). In detail, for each iteration subsequent to that considered, steps S03-S11 are repeated to obtain a respective second acceleration value $A_2$.

From an examination of the characteristics of the disclosure made according to the present disclosure, the advantages that it affords are evident.

In particular, the sensor 50 has a single seismic mass 53 and a single elastic assembly 57 and does not foresee, in use, contacts or shocks between parts being movable to each other. Consequently, the sensor 50 has a reduced size, a lower power consumption, a better integrability and a greater reliability (since the probability of sticking or damage due to shocks being too high is reduced). For example, the number of electrical contacts and pads is reduced with respect to the known solutions previously listed and this reduces the total cost and the manufacturing complexity of the sensor 50 and of the measurement device 100.

The measurement device 100 allows accelerations with a high full scale range (e.g., 32 G) and a high sensitivity (e.g., 1 mG/LSB) to be sensed. This occurs owing to the two-step measurement process of the control method 150, and in particular it is made possible by acquiring the first value $S_{m1}$ of the measurement signal $S_m$ (with maximum full scale range but minimum sensitivity) and subsequently acquiring, as a function of the first acceleration value $A_1$ that is measured, the second value $S_{m2}$ of the measurement signal $S_m$ (with lower full scale range but greater sensitivity, suitably adjusted as a function of the first acceleration measurement given by the first acceleration value $A_1$). In this manner both high and low accelerations ("high-G" and "low-G") may be measured accurately and without the need to use complex measurement structures such as those known and previously mentioned.

Finally, it is clear that modifications and variations may be made to the disclosure described and illustrated herein without thereby departing from the scope of the present disclosure.

In particular, the structure of the sensor 50 may be different from that previously described.

For example, the first and the second springs 57a and 57b may not have a serpentine shape but be folded springs or have a rotated or annular serpentine shape. Moreover, the springs 57a, 57b may have respective partial elastic constants $K_p$ of different values from each other; in this case, the equivalent elastic constant $K_{eq}$ has, in the first operating mode of the sensor 50, a value equal to the sum of the partial elastic constants $K_p$ of the springs 57a, 57b.

Moreover, the measurement structure 68 and the control structure 72 may have different positions with respect to what has been previously listed. For example, they might be made reversely with respect to what has been previously described (the measurement structure 68 facing the third lateral surface 53c of the seismic mass 53 and the control structure 72 extending into the accommodation through opening 76) or face one the third lateral surface 53c and the other the fourth lateral surface 53d of the seismic mass 53, or both face one of these lateral surfaces 53c, 53d of the seismic mass 53.

The control structure 72 may also be controlled in the second state in such a way that the sensor 50 in the second operating mode has a second value of the total elastic constant $K_t$ which is exclusively lower than the first value of the total elastic constant $K_t$, so that the second acceleration value $A_2$ is always measured with a greater sensitivity with respect to the first acceleration value $A_1$. In other words, in this case $S_{c2} \neq S_{c1}$ (i.e., $S_{c2} > 0$ LSB) in the second time interval $T_2$.

Moreover, the acceleration sensing may occur in a manner different from the capacitive one and for example in a piezoresistive or piezoelectric manner.

Moreover, although the control method 150 has heretofore been described with a first and a second measurement step, it may similarly comprise a number of measurement steps greater than two. In other words, in each period T it is possible to acquire a plurality (L>2) of acceleration values $A_i$ in a respective plurality of time intervals $T_i$, each acceleration value $A_i$ being used to determine the value of the control signal $S_c$ in the consecutive time interval $T_{i+1}$ in order to get to a further optimized final acceleration value $A_{i=L}$.

A micromechanical device (50) may be summarized as including a semiconductor body (51) having a surface (51); a movable structure (53) facing said surface (51) of the semiconductor body (51) and configured to oscillate relative to the semiconductor body (51) along an oscillation direction (61); and an elastic assembly (57) which has an equivalent elastic constant ($K_{eq}$), is mechanically coupled to the movable structure (53) and to the semiconductor body (51) and is configured to elongate and contract along the oscillation direction (61) to allow the oscillation of the movable structure (53) as a function of a force applied to the movable structure (53) along said oscillation direction (61), said force being caused by an acceleration applied to the micromechanical device (50), wherein the movable structure (53) and the semiconductor body (51) include a control structure (72) for the capacitive control of the oscillation of the movable structure (53), the micromechanical device (50) having a total elastic constant ($K_t$) which is a function of the equivalent elastic constant ($K_{eq}$) and which is variable over time as a function of said capacitive control by the control structure (72), wherein when the control structure (72) is electrically controlled in a first state, the micromechanical device (50) is in a first operating mode wherein the total elastic constant ($K_t$) has a first value, and when the control structure (72) is electrically controlled in a second state, the micromechanical device (50) is in a second operating mode wherein the total elastic constant ($K_t$) has a second value lower than, or equal to, the first value.

The control structure (72) may be controllable through a control signal ($S_c$) having a first value ($S_{c1}$) or a second value ($S_{c2}$) greater than, or equal to, the first value ($S_{c1}$), and the micromechanical device (50) may be in the first operating mode when the control signal ($S_c$) assumes the first value ($S_{c1}$) and may be in the second operating mode when the control signal ($S_c$) assumes the second value ($S_{c2}$).

The movable structure (53) may include at least one first control electrode (72a) integral with the movable structure (53) to oscillate with the movable structure (53) and the semiconductor body (51) may include at least two second control electrodes (72b) integral with the semiconductor body (51), wherein the at least one first control electrode (72a) extends between, and may be capacitively coupled to, said at least two second control electrodes (72b) thus forming two respective control capacitors (72', 72") having each a variable capacitance, wherein the at least one first control electrode (72a) and the at least two second control electrodes (72b) may define the control structure (72), and wherein a control voltage difference ($V_c$) having a respective first value ($V_{c1}$) correlated to the first value ($S_{c1}$) of the control signal ($S_c$) or a respective second value ($V_{c2}$) correlated to the second value ($S_{c2}$) of the control signal ($S_c$) and greater than, or equal to, the first value ($V_{c1}$) of the control voltage ($V_c$), may be applicable between the at least one first control electrode (72a) and the at least two second control electrodes (72b) to control the control structure (72) in the first state or, respectively, in the second state.

The micromechanical device may further include a measurement structure (68) for the capacitive sensing of the oscillation of the movable structure (53).

The measurement structure (68) may include at least one first measurement electrode (68a) biasable to a first bias voltage (V1) and integral with the movable structure (53) to oscillate with the movable structure (53); and at least two second measurement electrodes (68b) integral with the substrate (51) and biasable to a second bias voltage (V2; V2"), wherein the first measurement electrode (68a) extends between, and may be capacitively coupled to, said at least two second measurement electrodes (68b) so as to form two respective measurement capacitors (68', 68") having each a variable capacitance.

A measurement device (100) may be summarized as including a micromechanical device (50), and a control unit (102) electrically coupled to the micromechanical device (50) and configured to control (S03), in a first time interval ($T_1$), the control structure (72) in the first state to have the micromechanical device (50) in the first operating mode; acquire (S03), in the first time interval ($T_1$) and through the micromechanical device (50), a first value ($S_{m1}$) of a measurement signal ($S_m$), the first value ($S_{m1}$) of the measurement signal ($S_m$) being indicative of a first acceleration value ($A_1$) measured by the micromechanical device (50) in the first operating mode; determine (S05) the first acceleration value ($A_1$) on the basis of the first value ($S_{m1}$) of the measurement signal ($S_m$); control (S07, S09), as a function of the first acceleration value ($A_1$) and in a second time interval ($T_2$) consecutive to the first time interval ($T_1$), the control structure (72) in the second state to have the micromechanical device (50) in the second operating mode; acquire (S09), in the second time interval ($T_2$) and through the micromechanical device (50), a second value ($S_{m2}$) of the measurement signal ($S_m$), the second value ($S_{m2}$) of the measurement signal ($S_m$) being indicative of a second acceleration value ($A_2$) measured by the micromechanical device (50) in the second operating mode; and determine (S11) the second acceleration value ($A_2$) on the basis of the second value ($S_{m2}$) of the measurement signal ($S_m$).

The control structure (72) may be controllable through a control signal ($S_c$) having a first value ($S_{c1}$) or a second value ($S_{c2}$) greater than, or equal to, the first value ($S_{c1}$), wherein the micromechanical device (50) may be in the first operating mode when the control signal ($S_c$) assumes the first value ($S_{c1}$) and may be in the second operating mode when the control signal ($S_c$) assumes the second value ($S_{c2}$), wherein the movable structure (53) may include at least one first control electrode (72a) integral with the movable structure (53) to oscillate with the movable structure (53) and the semiconductor body (51) may include at least two second control electrodes (72b) integral with the semiconductor body (51), wherein the at least one first control electrode (72a) extends between, and may be capacitively coupled to, said at least two second control electrodes (72b) thus forming two respective control capacitors (72', 72'') having a variable capacitance, wherein the at least one first control electrode (72a) and the at least two second control electrodes (72b) may define the control structure (72), wherein a control voltage difference ($V_c$), having a respective first value ($V_{c1}$) correlated to the first value ($S_{c1}$) of the control signal ($S_c$) or a respective second value ($V_{c2}$) correlated to the second value ($S_{c2}$) of the control signal ($S_c$) and greater than, or equal to, the first value ($V_{c1}$) of the control voltage difference ($V_c$), may be applicable between the at least one first control electrode (72a) and the at least two second control electrodes (72b) to control the control structure (72) in the first state or, respectively, in the second state, wherein the micromechanical device (50) may further include a measurement structure (68) for the capacitive sensing of the oscillation of the movable structure (53), wherein the measurement structure (68) may include at least one first measurement electrode (68a) biasable to a first bias voltage (V1) and integral with the movable structure (53) to oscillate with the movable structure (53); and at least two second measurement electrodes (68b) integral with the substrate (51) and biasable to a second bias voltage (V2; V2''), wherein the first measurement electrode (68a) extends between, and may be capacitively coupled to, said at least two second measurement electrodes (68b) so as to form two respective measurement capacitors (68', 68'') having each a variable capacitance, wherein the measurement device (100) may further include an interface unit (104) including a C/V conversion block (106) electrically coupled to the micromechanical device (50) and configured to acquire a first sensing signal ($S_{r1}$) and a second sensing signal ($S_{r2}$) each indicative of the capacitance of a respective one of the measurement capacitors (68', 68'') and to generate, on the basis of a difference between the first sensing signal ($S_{r1}$) and the second sensing signal ($S_{r2}$), a differential signal ($S_{diff}$) indicative of the acceleration sensed by the micromechanical device (50); a demodulation block (108) electrically coupled to the C/V conversion block (106) and configured to receive the differential signal ($S_{diff}$) and to generate a demodulated signal ($S_{dem}$) at a control frequency ($f_c$) through demodulation of the differential signal ($S_{diff}$); an ADC block (110) electrically coupled to the demodulation block (108) and to the control unit (102) and configured to receive the demodulated signal ($S_{dem}$), of analog type, and to generate the measurement signal ($S_m$), of digital type, on the basis of the demodulated signal ($S_{dem}$); and a DAC block (112) electrically coupled to the control unit (102) and configured to receive said control signal ($S_c$), of digital type and generated by the control unit (102), and to generate a control voltage difference ($V_c$), of analogue type, on the basis of the control signal ($S_c$).

A control method (150) of a measurement device (100) may be summarized as including a micromechanical device (50) and a control unit (102) electrically coupled to the micromechanical device (50), the micromechanical device (50) including a semiconductor body (51) having a surface (51); a movable structure (53) facing said surface (51) of the semiconductor body (51) and configured to oscillate relative to the semiconductor body (51) along an oscillation direction (61); and an elastic assembly (57) which has an equivalent elastic constant ($K_{eq}$), is mechanically coupled to the movable structure (53) and to the semiconductor body (51) and is configured to elongate and contract along the oscillation direction (61) to allow the oscillation of the movable structure (53) as a function of a force applied to the movable structure (53) along said oscillation direction (61), said force being caused by an acceleration applied to the micromechanical device (50), wherein the movable structure (53) and the semiconductor body (51) include a control structure (72) for the capacitive control of the oscillation of the movable structure (53), the micromechanical device (50) having a total elastic constant ($K_t$) which is a function of the equivalent elastic constant ($K_{eq}$) and which is variable over time as a function of said capacitive control by the control structure (72), the control method (150) including the steps of: controlling (S03), by the control unit (102) and in a first time interval ($T_1$), the control structure (72) in a first state to have the micromechanical device (50) in a first operating mode wherein the total elastic constant ($K_t$) has a first value; acquiring (S03), by the control unit (102), in the first time interval ($T_1$) and through the micromechanical device (50), a first value ($S_{m1}$) of a measurement signal ($S_m$), the first value ($S_{m1}$) of the measurement signal ($S_m$) being indicative of a first acceleration value ($A_1$) measured by the micromechanical device (50) in the first operating mode; determining (S05), by the control unit (102), the first acceleration value ($A_1$) on the basis of the first value ($S_{m1}$) of the measurement signal ($S_m$); controlling (S07, S09), by the control unit (102), as a function of the first acceleration value ($A_1$) and in a second time interval ($T_2$) consecutive to the first time interval ($T_1$), the control structure (72) in a second state to have the micromechanical device (50) in a second operating mode wherein the total elastic constant ($K_t$) has a second value lower than, or equal to, the first value of the total elastic constant ($K_t$); acquiring (S09), by the control unit (102), in the second time interval ($T_2$) and through the micromechanical device (50), a second value ($S_{m2}$) of the measurement signal ($S_m$), the second value ($S_{m2}$) of the measurement signal ($S_m$) being indicative of a second acceleration value ($A_2$) measured by the micromechanical device (50) in the second operating mode; and determining (S11), by the control unit (102), the second acceleration value ($A_2$) on the basis of the second value ($S_{m2}$) of the measurement signal ($S_m$).

The step of controlling (S03) in the first time interval ($T_1$) the control structure (72) in the first state may include controlling the control structure (72) through a control signal (Se) having a first value ($S_{c1}$), and the step of controlling (S07, S09) in the second time interval ($T_2$) the control structure (72) in the second state may include determining (S07) a second value ($S_{c2}$) of the control signal ($S_c$) on the basis of the first acceleration value ($A_1$); and controlling (S09) the control structure (72) through the control signal ($S_c$) having said second value ($S_{c2}$), wherein the first value ($S_{c1}$) of the control signal ($S_c$) may be a predefined value, and the second value ($S_{c2}$) of the control signal ($S_c$) may be greater than, or equal to, the first value ($S_{c1}$) of the control signal ($S_c$), may be inversely proportional to the first acceleration value ($A_1$) and may include between a minimum value and a maximum value, the second value ($S_{c2}$) of the control signal ($S_c$) being equal to said minimum value when the first acceleration value ($A_1$) is equal to a maximum acceleration value measurable by the micromechanical device (50) and being equal to said maximum value when the first acceleration value ($A_1$) is equal to a minimum acceleration value measurable by the micromechanical device (50), the minimum value of the control signal ($S_c$) being equal to the first value ($S_{c1}$) of the control signal ($S_c$).

The control method (150) may further include the step of generating, by the control unit (102), an output signal having a value indicative of the second acceleration value ($A_2$).

A computer program product storable into a control unit (102) of a measurement device (100), said computer program being designed in such a way that, when executed, the control unit (102) may become configured to implement a control method (150) of the measurement device (100).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A micromechanical device, comprising:
   a semiconductor body having a surface;
   a movable structure facing said surface of the semiconductor body, the movable structure having an opening in a central region;
   a measurement structure including:
      a first measurement electrode extending from the movable structure; and
      two second measurement electrodes fixed to the semiconductor body, the first measurement electrode between the two second measurement electrodes;
   a control structure including:
      a first control electrode extending from the movable structure; and
      two second control electrodes fixed to the semiconductor body, the first control electrode extending between the two second control electrodes; and
   an elastic assembly which has an equivalent elastic constant ($K_{eq}$), is mechanically coupled to the movable structure and to the semiconductor body and is configured to elongate and contract along an oscillation direction to allow oscillation of the movable structure as a function of a force applied to the movable structure along said oscillation direction, said force being caused by an acceleration applied to the micromechanical device having a total elastic constant ($K_t$) which is a function of the equivalent elastic constant ($K_{eq}$) and which is variable over time as a function of capacitive control by the control structure.

2. The micromechanical device according to claim 1, wherein the control structure is configured to be controlled through a control signal having a first value or a second value greater than, or equal to, the first value, and
   wherein the micromechanical device is in a first operating mode when the control signal assumes the first value and is in a second operating mode when the control signal assumes the second value.

3. The micromechanical device according to claim 2, wherein when the control structure is electrically controlled in a first state, the micromechanical device is in the first operating mode wherein the total elastic constant ($K_t$) has a first value, and when the control structure is electrically controlled in a second state, the micromechanical device is in the second operating mode wherein the total elastic constant ($K_t$) has a second value lower than, or equal to, the first value, and the device comprising two respective control capacitors each having a variable capacitance that including the first control electrode that is capacitively coupled to the two second control electrodes,
   wherein a control voltage difference, having a respective first value correlated to the first value of the control signal or a respective second value correlated to the second value of the control signal and greater than, or equal to, the first value of the control voltage, is applicable between the at first control electrode and the two second control electrodes to control the control structure in the first state or, respectively, in the second state.

4. The micromechanical device according to claim 1, wherein the measurement structure capacitively senses oscillation of the movable structure.

5. The micromechanical device according to claim 4, wherein the first measurement electrode is biasable to a first bias voltage; and
   the two second measurement electrodes are biasable to a second bias voltage,
   wherein the first measurement electrode is capacitively coupled to two second measurement electrodes forming two respective measurement capacitors each having a variable capacitance.

6. The micromechanical device according to claim 1, wherein the elastic assembly has a first end coupled to a first side of the movable structure.

7. A measurement device, comprising:
   a micromechanical device that includes:
      a semiconductor body having a surface;
      a movable structure facing the surface of the semiconductor body and having an opening in a central region;
      a first measurement electrode extending from the movable structure in the opening, the first measurement electrode extending towards a first side of the movable structure; and
      two second measurement electrodes fixed to the semiconductor body and in the opening of the movable structure, the first measurement electrode between the two second measurement electrodes;
      a control structure that includes:
         a first control electrode extending from the first side of the movable structure and away from the opening in the movable structure; and
         two second control electrodes fixed to the semiconductor body, the first control electrode extending between the two second control electrodes;

an elastic assembly which has an equivalent elastic constant ($K_{eq}$), is mechanically coupled to the movable structure and is configured to elongate and contract along an oscillation direction to allow the oscillation of the movable structure as a function of a force applied to the movable structure along said oscillation direction, said force being caused by an acceleration applied to the micromechanical device the micromechanical device having a total elastic constant ($K_t$) which is a function of the equivalent elastic constant ($K_{eq}$) and which is variable over time as a function of capacitive control by the control structure; and a control unit electrically coupled to the micromechanical device and configured to:
control, in a first time interval ($T_1$), the control structure in a first state to have the micromechanical device in a first operating mode wherein the total elastic constant ($K_t$) has a first value;
acquire, in the first time interval ($T_1$) and through the micromechanical device, a first value ($S_{m1}$) of a measurement signal ($S_m$), the first value ($S_{m1}$) of the measurement signal ($S_m$) being indicative of a first acceleration value ($A_1$) measured by the micromechanical device in the first operating mode;
determine the first acceleration value ($A_1$) on the basis of the first value ($S_{m1}$) of the measurement signal ($S_m$);
control, as a function of the first acceleration value ($A_1$) and in a second time interval ($T_2$) consecutive to the first time interval ($T_1$), the control structure in a second state to have the micromechanical device in a second operating mode wherein the total elastic constant ($K_t$) has a second value lower than, or equal to, the first value;
acquire, in the second time interval ($T_2$) and through the micromechanical device, a second value ($S_{m2}$) of the measurement signal ($S_m$), the second value ($S_{m2}$) of the measurement signal ($S_m$) being indicative of a second acceleration value ($A_2$) measured by the micromechanical device in the second operating mode; and
determine the second acceleration value ($A_2$) on the basis of the second value ($S_{m2}$) of the measurement signal ($S_m$).

8. The measurement device according to claim 7, wherein the control structure is controllable through a control signal ($S_c$) having a first value ($S_{c1}$) or a second value ($S_{c2}$) greater than, or equal to, the first value ($S_{c1}$),
wherein the micromechanical device is in the first operating mode when the control signal ($S_c$) assumes the first value ($S_{c1}$) and is in the second operating mode when the control signal ($S_c$) assumes the second value ($S_{c2}$),
wherein a control voltage difference ($V_c$), having a respective first value ($V_{c1}$) correlated to the first value ($S_{c1}$) of the control signal ($S_c$) or a respective second value ($V_{c2}$) correlated to the second value ($S_{c2}$) of the control signal ($S_c$) and greater than, or equal to, the first value ($V_{c1}$) of the control voltage difference ($V_c$), is applicable between the first control electrode and the two second control electrodes to control the control structure in the first state or, respectively, in the second state,
comprising an interface unit including:
a C/V conversion block coupled to the micromechanical device and configured to acquire a first sensing signal and a second sensing signal each indicative of a capacitance of a respective one of the two second measurement electrodes and to generate, on the basis of a difference between the first sensing signal and the second sensing signal, a differential signal indicative of the acceleration sensed by the micromechanical device;
a demodulation block coupled to the C/V conversion block and configured to receive the differential signal and to generate a demodulated signal at a control frequency through demodulation of the differential signal;
an ADC block coupled to the demodulation block and to the control unit and configured to receive the demodulated signal, of analog type, and to generate the measurement signal, of digital type, on the basis of the demodulated signal; and
a DAC block coupled to the control unit and configured to receive said control signal, of digital type and generated by the control unit, and to generate a control voltage difference, of analogue type, on the basis of the control signal.

9. A control method of a measurement device, comprising:
controlling, by a control unit coupled to a micromechanical device, in a first time interval, a control structure of a movable structure and semiconductor body in a first state to have the micromechanical device in a first operating mode wherein a total elastic constant has a first value;
acquiring, by the control unit, in the first time interval and through the micromechanical device, a first value of a measurement signal, the first value of the measurement signal being indicative of a first acceleration value measured by the micromechanical device in the first operating mode;
determining, by the control unit, the first acceleration value based on the first value of the measurement signal;
controlling, by the control unit, as a function of the first acceleration value and in a second time interval consecutive to the first time interval, the control structure in a second state to have the micromechanical device in a second operating mode wherein the total elastic constant has a second value lower than, or equal to, the first value of the total elastic constant;
acquiring, by the control unit, in the second time interval and through the micromechanical device, a second value of the measurement signal, the second value of the measurement signal being indicative of a second acceleration value measured by the micromechanical device in the second operating mode; and
determining, by the control unit, the second acceleration value based on the second value of the measurement signal.

10. The control method according to claim 9, wherein the controlling in the first time interval the control structure in the first state includes controlling the control structure through a control signal having a first value, and
wherein the controlling in the second time interval the control structure in the second state includes:
determining a second value of the control signal based on the first acceleration value; and
controlling the control structure through the control signal having said second value of the control signal,
wherein the first value of the control signal is a predefined value, and wherein the second value of the control signal is greater than, or equal to, the first value of the control signal, is inversely proportional to the first acceleration value and is between a minimum value and a maximum value, the second value of the control signal being equal to said minimum value when the first acceleration value is equal to a maximum acceleration value measurable by the micromechanical device and being equal to said maximum value when the first acceleration value is equal to a minimum acceleration value measurable by the micromechanical device, the minimum value of the control signal being equal to the first value of the control signal.

11. The control method according to claim 10, comprising generating, by the control unit, an output signal having a value indicative of the second acceleration value.

12. A device, comprising:
a substrate;
a mass over the substrate, the mass including:
    a first electrode extending from a first side of the mass;
    a central opening; and
    a second electrode coupled to the mass and in the central opening, the second electrode extending towards the first electrode of the mass;
a plurality of measurement electrodes coupled to the substrate, the first electrode extending between the plurality of first measurement electrodes;
a plurality of control electrodes coupled to the substrate, the second electrode extending between the plurality of control electrodes; and
a first spring assembly having a first end coupled to the substrate, the first spring assembly having a second end, opposite the first end, coupled to a second side of the mass, the second side of the mass transverse to the first side of the mass.

13. The device according to claim 12, comprising at least two first fixed electrodes coupled to the substrate in the central opening of the mass, the second electrode extending between the at least two first fixed electrodes.

14. The device according to claim 13, comprising at least two second fixed electrodes coupled to the substrate adjacent the first side of the mass, the first electrode extending between the at least two second fixed electrodes.

15. The device according to claim 14, wherein the first electrode and the second electrode both extend along a center line.

16. The device according to claim 15, comprising a plurality of blocking elements coupled to the substrate, ones of the plurality of blocking elements spaced from corners of the mass.

17. The device according to claim 16, wherein first ones of the plurality of blocking elements are spaced from the second side of the mass.

18. The device according to claim 17, wherein second ones of the plurality of blocking elements are spaced from a third side of the mass that is opposite the second side of the mass.

19. The device according to claim 18, wherein the first spring assembly is between the first ones of the plurality of blocking elements.

20. The device of claim 12, comprising a second spring assembly having a first end coupled to the substrate, the second spring assembly having a second end, opposite the first end, coupled to a third side of the mass, the third side opposite the second side of the mass.

* * * * *